March 2, 1948. P. BRICOUT 2,436,788
METHOD AND APPARATUS FOR CURVE DISTORTION OF ALTERNATING CURRENTS
Filed April 21, 1942 2 Sheets-Sheet 1
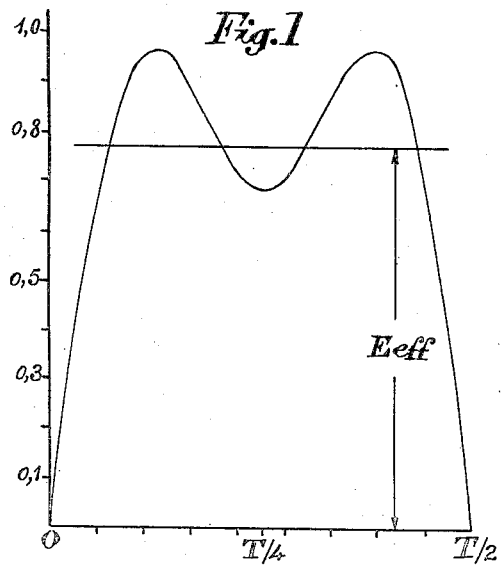
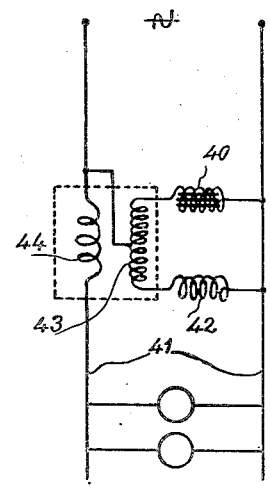
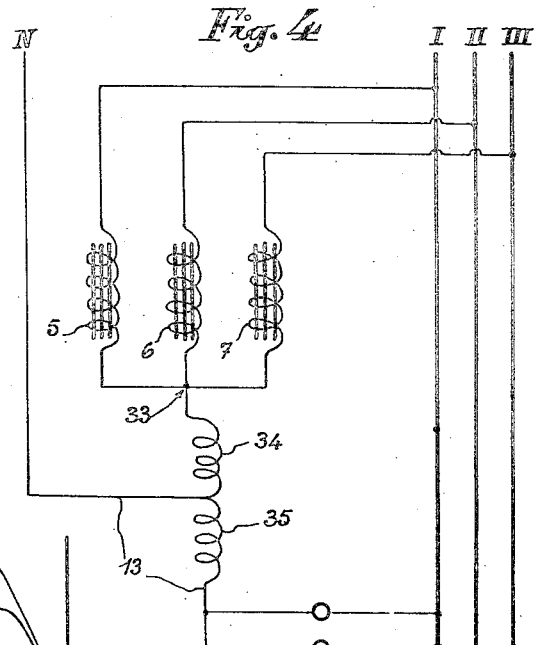
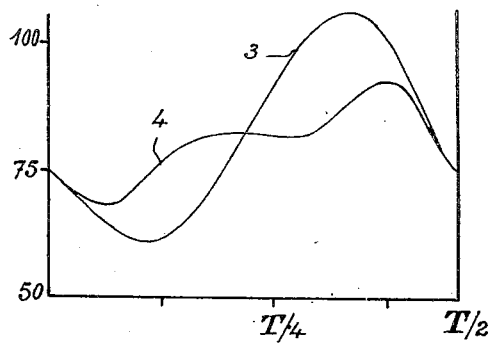
Inventor:
PIERRE BRICOUT
By Haseltine Lake & Co.
Attorneys.

March 2, 1948.   P. BRICOUT   2,436,788
METHOD AND APPARATUS FOR CURVE DISTORTION OF ALTERNATING CURRENTS
Filed April 21, 1942    2 Sheets-Sheet 2
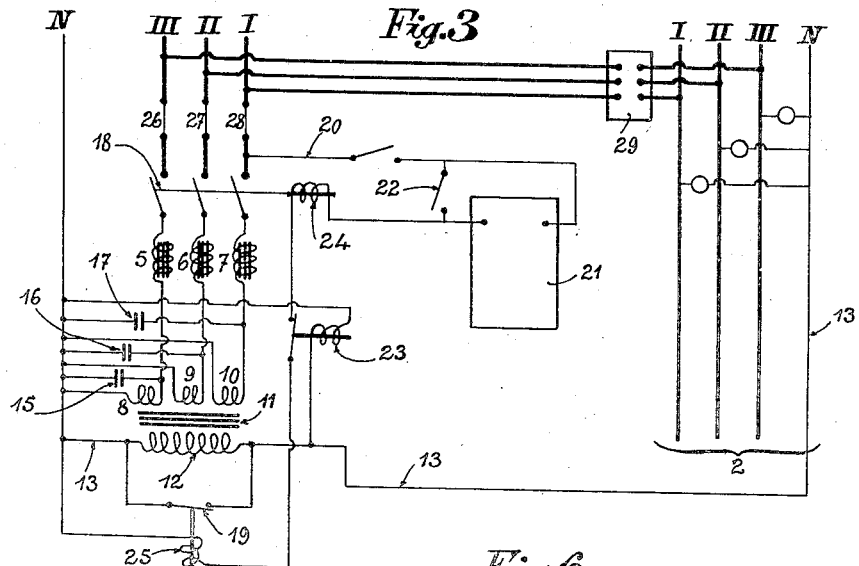
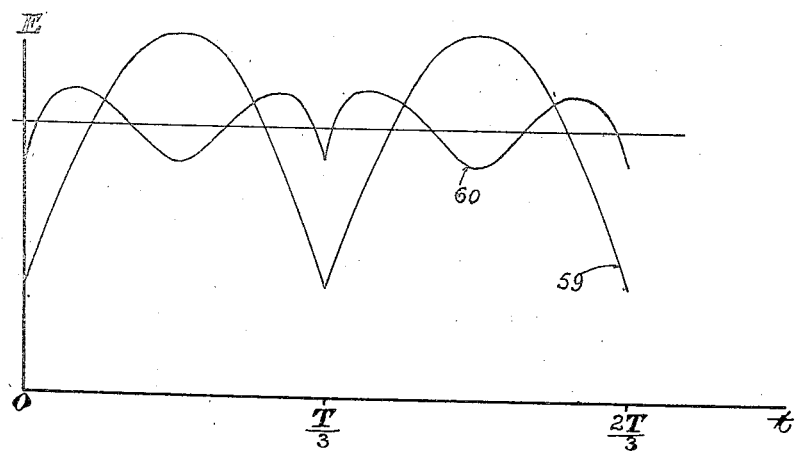
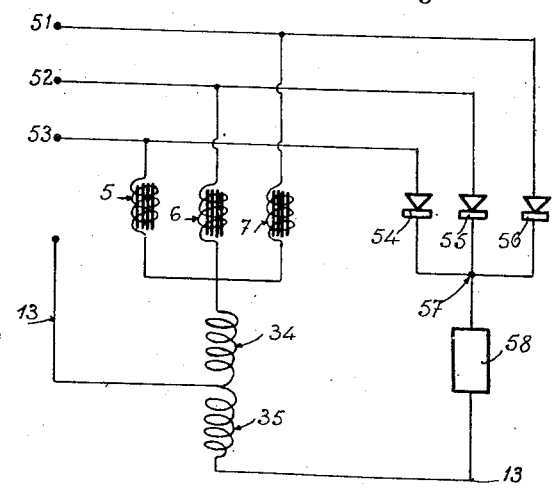
Inventor:
PIERRE BRICOUT
By Haseltine Lake & Co.
Attorneys.

Patented Mar. 2, 1948

2,436,788

UNITED STATES PATENT OFFICE 2,436,788

METHOD AND APPARATUS FOR CURVE DISTORTION OF ALTERNATING CURRENTS

Pierre Bricout, Senlis (Oise), France; vested in the Attorney General of the United States Application April 21, 1942, Serial No. 439,904
In France April 28, 1941

5 Claims. (Cl. 175—363)

As is well known, the sinusoidal shape which it is sought to impart to intensity and tension curves of alternating currents presents great advantages in most cases though not being the most favorable one for certain predetermined uses of these currents. Thus in particular the use of tension or intensity curves having outlines like that of a trapezium makes it possible to lessen flickering of such lamps as are fed by very low frequency alternating currents and to obtain a practically direct current merely by rectifying with the aid of dry or other cells a system of three-phase currents. However, as it is generally desirable that alternating currents should remain sinusoidal throughout the major portion of the distribution network (for example a power transmission line or a line feeding a revolving field motor) it will be seen that it is necessary to modify or distort the shape of the tension and intensity curves only over a well defined portion of the distribution. Obviously such distortion, if possible, should be accomplished automatically without necessitating the use of machines requiring constant upkeep and supervision.

An object of the present invention is to provide a new or improved method by means of which to the tension or intensity curve of alternating currents may be imparted a shape similar to a trapezium, thereby obviating the aforesaid disadvantages and particularly light flickering in the case of lamps fed by low frequency alternating current.

Another object of the invention is to provide a method as aforesaid owing to which tension fluctuations may be considerably reduced whereby there may be obtained from a three-phase rectifier as constant a current tension as that furnished by a six-phase rectifier of the usual type.

A further object of the invention is to provide a method as aforesaid making it possible in alternating current networks to substitute for three six-phase transformers, a harmonic generator having only one-sixteenth of the power formerly needed, thereby greatly saving in iron and leads.

A further object of the invention is to provide a method as aforesaid enabling in this type of installation a saving of approximately fifty-five per cent in the number of dry rectifier cells to be achieved, said saving being ascribable to a reduction in the number of phases where a rectifier is used.

A further object of the invention is to provide a method as aforesaid by means of which entirely automatic stationary chargers may be realized, these providing for accumulator batteries a steady charging rate without detrimental overloads.

A still further object of the invention is to provide an improved appliance for carrying out the aforesaid novel method, said appliance being readily adaptable to existing plants and making it possible amongst other advantages to derive from alternating currents modified currents having such a substantially constant instantaneous intensity as to become almost direct currents, thereby being utilisable for feeding D. C. motors, for charging batteries and for similar applications.

With these and such other objects in view as will incidentally appear hereafter, the invention comprises the novel features and combination of features and steps that will now be set forth with reference to the accompanying diagrammatic drawings exemplifying its applications to three-phase and single-phase current distribution systems and forming a part of the present disclosure.

In the drawings:

Figure 1 is a diagrammatic view showing the curve of a sinusoidal wave provided with a third harmonic in relative amplitude phase $A=\frac{1}{3}$.

Figure 2 is a view showing the curves illustrating the light intensity of the zigzag-shaped filament of a 40 watt lamp, said filament being supported in vacuum and fed with sinusoidal current and with undulatory current respectively.

Figures 3 and 4 are views showing two different wiring diagrams for three-phase current distributing plants.

Figure 5 is a view showing a wiring diagram for a plant adapted to feed a three-phase rectifier.

Figure 6 is a view showing curves respectively setting forth a sinusoidal current feed and an undulatory current feed.

Figure 7 is a view showing a wiring diagram for a plant adaptable to a single-phase current network.

Like reference characters designate like parts throughout the several views.

Before proceeding with a detailed description of the figures, it may be stated, generally speaking, that the method according to the invention consists in realizing a tension or intensity curve having a shape approximating that of a trapezium by superimposing on the sinusoidal curves which require to be modified a third harmonic in phase with the sinusoidal function to be modified.

Assuming, as an algebraic illustration of the foregoing, $A \sin \omega t$ to designate the original sinusoidal tension or intensity, then the tension or intensity when modified by the present method will be expressed by a formula of the following form: $A \sin \omega t + B \sin (B3 \, \omega t + \theta)$ wherein $B/A$ has a value which is dependent upon the kind of contemplated use, said value being generally comprised between .2 and .4, while the phase angle $\theta$ which is theoretically equal to zero should not in practical embodiments exceed a few degrees.

The appliance for producing and superimposing the third harmonic in suitable phase comprises in all embodiments: in combination, saturated choke or reactance coils and a so-called injection transformer whose secondary winding is so interposed in the distribution leads as to inject thereinto such harmonic components as to periodically take and give energy.

Such an appliance will of course vary depending upon whether a three-phase current curve or a one-phase current curve must be distorted.

Where three-phase currents have to be delivered by a network comprising a middle or "neutral" lead, the appliance will comprise three saturated choke or reactance coils respectively connected to the three phases and to a common point so as to provide a compensation of the basic component, and an injection transformer whose primary winding is connected on the one side to the common point of the saturated coils and on the other side to the neutral point of the distribution, while its secondary winding is inserted in the proper direction intermediate the ends of the neutral lead.

This arrangement affords among other advantages that of lowering the flickering of electric bulbs or lamps to such an extent that due regard being paid to the known sensorial persistence on the eye retina, such flickering is no longer perceived by the eye and the ensuing strain is obviated. A concomitant advantage of this arrangement is that lamps thus fed then receive electric current whose curve has the aforesaid outline and materially lessens temperature variations and luminous intensity fluctuations of the glowing filament in the course of a cycle.

When a system of three-phase tensions or voltages having the aforesaid curve shape is applied to a three-shape rectifier made up preferably of dry or like cells having unidirectional conductivity and as low a reactance as possible, the provision is afforded by suitably regulating the amplitude of harmonic tension to obtain almost continuous, i. e. direct current which can be used for feeding motors, storage batteries and more generally for all purposes requiring currents whose instantaneous intensity is substantially constant.

The insertion of the so-called injection transformer in the middle or neutral lead allows currents having the aforesaid curve outline to flow only through apparatus connected across the phase and neutral leads such as lamps, rectifiers or the like wherein such currents have a useful effect since they are practically always subjected to simple sinusoidal tensions. Conversely, motors connected across phase leads are not fed by distorted currents since this would present no useful purpose.

An appliance for carrying out the novel method in the case of one-phase alternating current distribution comprises a so-called injection transformer whose secondary winding is tapped to the delivery circuit while its two primary windings respectively receive current from a saturated choke coil and current from a choke coil having a slightly varying inductance, whereby the basic component fluxes cancel each other.

It will be seen from the foregoing that in all contemplated uses of the novel method, the latter comprises three simultaneous operations as follows:

1. Obtaining by means of saturated choke coils fed by the sinusoidal tension which must be distorted currents having a so-called basic component and the same frequency as the feeding tension and a harmonic tension of triple frequency in phase opposition to the first-named tension.

2. Cancelling basic components or their effects either by a direct compensation in the case of three-phase currents or by eliminating their fluxes by an equal and oppositely directed flux in the case of simple alternating current.

3. Adding harmonic components (in phase where three-phase currents are dealt with) and injecting said components into the distribution network through a so-called injection transformer whose secondary winding is interconnected to the network.

Reference being now had to the accompanying drawings which will allow of a complete understanding of the invention, there is shown in Fig. 3 a lighting network generally designated by 2 and fed by a sinusoidal electromotive current the frequency of which is equal to say 25 cycles. The problem to be solved according to the invention is to improve the curve characteristics of the current which flows through said network. To that effect, there is superimposed on the above-cited frequency a sinusoidal tension having a frequency connoted by the figure 75 and such an amplitude and phase that where a non-reactive circuit such as a lamp circuit is fed, the intensity should comprise a third harmonic in phase with the basic tension and a relative amplitude equal to say 1/3.

The curve plotted on Fig. 1 brings out, in terms of time, the undulatory feeding tension once the method according to the invention has been applied thereto and its efficient value designated by E eff.

The showing of Fig. 2 enables a comparison to be made as to the luminosity (measured in candle units per square centimeter of glowing filament) with respect to time between a conventional lamp fed by a sinusoidal current (curve 3) and the same lamp fed by an undulatory current (curve 4). This comparison of the two curves shows that the application of the novel method reduces the space between the extreme values of the flash or shining power of the glowing filament.

It is known that the frequency of a sinusoidal current can be trebled by means of a combination of magnetic circuits comprising only stationary parts.

Assuming now the three tensions of a three-phase distribution to be applied to three identical choke coils such as 5, 6, 7 (Fig. 3) there will be obtained in each circuit, provided the number of turns of each of the impedances is so selected as to enable the iron saturation to be reached, a pulsating current characterized by the appearance of strong alternating current impulses separated by time intervals during which the intensity remains relatively weak. Now to one and the same circuit may be algebraically added the current impulses from the three choke coils by causing the currents from each coil to flow through identical windings 8, 9, 10 arranged on the magnetic circuit of a non-saturated transformer 11. The electromotive force generated in the secondary circuit 12 of the injection transformer will have a frequency equal to three times that of the basic three-phase currents.

This electro-motive force whose phase and frequency are thus controlled is supplied to the neutral lead 13 of the network 2 through the secondary winding 12 of transformer 11.

Such an appliance which, as will be understood, is a stationary electromagnetic device obviously requires neither maintenance nor supervision and can operate for a very long period without repair.

The shunting of the primary windings 8, 9, 10 by condensers such as shown at 15, 16, 17 improves the operation under full load and under unbalanced load conditions.

Safety devices may be provided for readily changing from undulatory current to sinusoidal current or vice versa. To that effect, all that is needed is to short-circuit the secondary winding of the so-called injection transformer and to disconnect the choke coils from the source of supply. Such results may be obtained by means of a three-pole switch 18 for the choke coils and a one-pole switch 19 for the short circuit.

The starting and stopping of the harmonic generator may be effected also at any suitable time and without requiring any special precautionary step by means of a hand operated switch 20 or a switch clock or equivalent time switch 21. A master switch 22 is provided for rendering the clock 21 inoperative and switching in the harmonic generator at any desired time outside the schedule of operation by the clock.

In order to protect a plant constructed as above described against no voltage on one or two phases of the network or against an undue unbalance in the load, a relay 23 is tapped across the terminals of the secondary winding and so adjusted as to open the operating circuit for the switches as soon as the tension at said terminals exceeds a predetermined limit and then to reclose said circuit when this tension is reduced to a few volts.

Relays such as 24 and 25 are provided to enable an automatic control of the three-phase switch 18 and one-pole switch 19 which, when inoperative, assume the positions shown in Fig. 3 or reverse positions when the frequency multiplying device operates.

Moreover, the plant may be protected from such an accident as might eventually happen, however improbable this may seem, should a short circuit occur inside or between the terminals of the injection transformer. This protection may be secured by the use of three cut out fuses such as 26, 27, 28 mounted in series with each of the choke coils.

Where the lighting network is constituted by a plant owned by a subscriber to the electricity company, it is advantageous to substitute for the time switch 21 a three-phase relay 29 capable of automatically connecting in series the harmonic generator as soon as the load reaches a predetermined value and of bringing the same back to inoperative condition when the power absorbed by the plant is reduced to a certain amount.

A modification of the appliance for carrying out the novel method as applied to a three-phase current distribution system may be built on the basis of the following observation: Since the total of basic frequency components of the currents flowing through the saturated choke or reactance coils is equal to zero at every instant, it is not necessary for them to be impressed severally on primary windings of the injection transformer, but such components may be cancelled by a direct adding process consisting in interconnecting the ends of the choke coils which are located opposite to the feeding network. Beyond such interconnection, i. e. through the primary winding of the injection transformer only flow under such conditions those harmonic components of the coil currents whose order is a multiple of 3 and particularly the third harmonics produced by saturation of the iron. These become mutually added inside the primary winding of the injection transformer which, in this case, may be simple and may have its output terminal connected to the neutral lead of the distribution system. The secondary winding is then chiefly traversed by a harmonic current having a frequency three times that of the basic current and by proper connection of the windings in the desired phase relationship thereto. As the primary winding of the injection transformer is no longer traversed by the basic components of the choke coil currents, there is secured amongst other advantages a substantial reduction of losses by reason of the so-called Joule effect as well as by an increase of the power and efficiency of the appliance.

The constructional form shown in Fig. 4 comprises three saturated choke coils 5, 6, 7 having one end of their windings connected respectively to each phase of a three-phase current distributing network 2. The three other ends are jointly connected at 33 to the neutral lead 13 of the distribution system wiring through the primary winding 34 of the injection auto-transformer.

The basic components of those currents which flow through the choke coils 5, 6, 7 are mutually compensated by adding at each moment at the point 33, and the components corresponding to the harmonics whose order is a multiple of 3 and particularly to the third harmonic are added in the primary winding of the injection transformer whose secondary winding 35 is inserted in the neutral lead of the distribution system. It will be easily seen that through said winding can flow only harmonic components whose order is a multiple of 3.

This method of lessening the flickering of electric lamps presents amongst other advantages the following ones:

(a) The power of the harmonic current generator can be increased.

(b) The losses arising from the generator are diminished.

(c) A conventional auto-transformer may be used as an injection transformer, this involving a saving in purchasing cost.

(d) Correct operation may be secured even on widely unbalanced networks.

As a matter of course, all safety and control contrivances diagrammatically shown in Fig. 3 may be applied to the modification which has just been described in connection with three-phase currents. Such contrivances have been purposely omitted from Fig. 4 for the sake of clearness of the general illustration.

Should the method be applied to a three-phase current rectifier, the three leads 51, 52, 53 (Fig. 5) of a three-phase distribution wiring including a neutral lead feed 13, on the one hand, the saturated choke coils 5, 6, 7 and the primary winding 34 of the injection transformer of a harmonic generator and, on the other hand, the elements 54, 55, and 56 of a three-phase rectifier whose common point 57 is connected through the current-utilising apparatus 58 to the end of the secondary winding 35 of the injection transformer.

The current-utilising apparatus 58 may be for example a battery, a D. C. motor or any other electrically fed or controlled apparatus.

The rectifier circuits are subjected to three-phase undulatory tensions which, after being rectified, create at the terminals of the current-utilising apparatus a substantially constant tension. The best results can be obtained when the amplitude of the third harmonic injected into the distribution is substantially equal to one-fourth of the three-phase tension amplitude.

Owing to this arrangement, the power of the harmonic current is equal to one sixteenth only of the power spent in the utilising circuit. Power consumption for creating the harmonic is therefore quite small and is utilised (losses being deducted) in the utilising circuit. As a result of this, the conversion of sinusoidal currents into undulatory currents involves a high degree of efficiency which may reach 97%.

In Fig. 6, the curve 59 represents the tension variation, in terms of time, of a three-phase rectifier fed by sinusoidal current. In this figure, the curve 60 is concerned with the tension of the same rectifier when fed by undulatory currents as above stated. In this last-named case, the tension fluctuations do not exceed those obtained from a six-phase rectifier fed by a sinusoidal current.

It is noteworthy that the tension represented by the crest of the curve 60 is lower by about 10% than that shown by the curve 59. Accordingly assuming dry rectifiers comprising multiple elements to be used, the number of elements per phase may be reduced by 10%. As on the whole an equivalent result is obtained to that which a rectifier involving twice as many phases would give on sinusoidal voltage, it will be seen that a total saving of 55% is secured over the full number of the rectifying elements.

Moreover, as the harmonic tension as supplied by the plant increases when the intensity decreases, the peak or crest tension of the rectified current increases simultaneously with the increase of the counter-electromotive power of the battery being loaded. This makes it possible, by suitably dimensioning the several parts of the apparatus, to construct an entirely automatic static charger providing for a reasonable load without any detrimental overload.

It will be understood that the improved method can be applied to any industrial frequency and that the conventional or known arrangements of choke coils and condensers for reducing tension fluctuations may be adapted thereto.

The chief advantages to be derived therefrom are consequently as follows:

(a) Tension fluctuations are largely reduced so that from a three-phase rectifier may be derived a tension that will be substantially as constant as the one furnished by a usual six-phase rectifier.

(b) The use of a three-six-phase transformer may be avoided and instead a harmonic generator used having one-sixteenth of its power, thereby achieving a saving in iron and leads.

(c) An economy of 55% on the number of the dry rectifier elements is secured due to the fact that the number of elements per phase is lessened when utilising the improved method.

(d) The possibility is afforded of building entirely automatic chargers capable of supplying batteries with a reasonable load without detrimental overloads.

The difference of operation of the systems shown in Figs. 3 and 5 is as follows: In the wiring shown in Fig. 3, the cancellation of the basic components of the currents which flow through the saturated choke coils is obtained by adding together the fluxes produced by the latter through the magnetic circuit of the injection transformer. In fact, the basic components of the fluxes from the three choke coils have a total equal to zero, while the harmonic components of these fluxes are mutually in phase and are added to one another.

In the wiring diagram shown in Fig. 5, the outputs of the three choke coils are directly connected to a common point which coincides with the input terminal of the injection transformer, whereby a direct compensation of the basic components of the currents and the addition of the harmonic components may be performed at said point. An advantage of this arrangement lies in the fact that in the primary winding of the injection transformer now only flow harmonic currents, thereby lessening losses in the iron and copper parts and producing a generator of higher efficiency.

Where one-phase current is used, the wiring diagram as shown in Fig. 7 may be adapted with particular advantage. The current containing the third harmonic is generated in a saturated choke coil 40 comprising a closed magnetic circuit to which is supplied the sinusoidal tension to be corrected which feeds a lighting network 41. Simultaneously there is generated in a choke coil 42 having a substantially constant inductance such an intensity as will have a basic frequency and an amplitude comparable to the one which flows through the coil 42. Both currents circulate in reverse directions through the primary winding 43 of the injection transformer and are so regulated as to cause their fluxes to mutually compensate each other.

The resultant flux is therefore solely constituted by the flux from the third harmonic which induces in the secondary winding 44 of the injection transformer an electromotive force of triple frequency as is required for lessening or eliminating flickering of the lamps. Correct phasing is given by a suitable selection of the direction in which the winding lead is wound.

In this arrangement, the triple frequency component is always generated in a saturated choke coil. The accompanying basic component is cancelled owing to an inductive action through the primary winding of the injection transformer which comprises two portions through which the currents flow in reverse directions, that is, the current from the saturated choke coil and the current from a constant or slightly varying choke coil. It will be seen that this arrangement operates according to the principle of magnetic compensation of the fluxes as above described in connection with three-phase currents.

Minor constructional details of the foregoing appliance may be varied without departing from the ambit of the subjoined claims.

What is claimed is:

1. An appliance for distorting the sinusoidal curve graphically representing alternating electric three-phase currents fed to a three-phase distribution network having a neutral lead, comprising in combination with said network three saturated choke coils each of which is connected to one of the respective phases and to a common point for compensating the basic components, and an injection transformer having its primary winding connected at one end to said common point of the saturated coils and at the other end to the neutral lead of the network, the secondary winding of said transformer being connected to said neutral lead.

2. In an electric plant fed by three-phase alternating current, a three-phase alternating current supply having a neutral lead, a distribution network, an appliance for distorting the sinusoidal curve graphically representing said current so as to impart to said curve a trapezium-like outline, said appliance comprising three saturated choke coils each of which is interconnected to one of the respective phase leads of said supply and to an output point common to the three coils, a rectifier made up of three elements respectively connected to said leads and to a common output point connected to one terminal of the distribution network, and an injection transformer having its primary winding connected across the first-named common point and the neutral lead of the current supply and its secondary winding connected across said neutral lead and the opposite terminal of said network.

3. In an electrical distribution system in which the electrical power is supplied from a three-phase source through three separate phase lines having a neutral lead, three choke coils having one side connected respectively to the three-phase lines, a transformer having a primary winding assembly connected to the other side of each of said choke coils and to said neutral lead and adapted to produce a flux which is the algebraic sum function of the currents flowing through said choke coils, said transformer having an output winding connected to said neutral lead and being adapted to deliver compensating power to the load to reduce the power fluctuation.

4. In an electric distribution network fed by a three-phase alternating current supply having a neutral lead, a device for distorting the characteristic sinusoidal curve of said current so as to give to said curve a trapezium-like outline, said device comprising three inductance coils, a three pole switch connecting one side of said coils with said phases respectively, a harmonic injection transformer having three primary windings connected at one side respectively to said coils and the opposite side to said neutral lead and a secondary winding connected in said neutral lead, a switch adapted to short circuit said secondary winding, an operating circuit for said switches connected between the supply source and neutral lead for automatically starting and stopping the operation of said device, a switch clock in said circuit and a master switch controlling the current input to said switch clock.

5. In an electric distribution network having a neutral lead, said network being fed by a three-phase alternating current supply having a neutral lead, an appliance for distorting the characteristic sinusoidal curve of said current so as to impart to said curve a trapezium-like outline, said appliance comprising three saturated choke coils each of which is connected to one of the respective phase leads, a third harmonic injection transformer corelated to said coils and having three primary windings respectively connected to the coils and a secondary winding connected across the neutral leads of the distribution network and of the current supply respectively and condensers shunting said primary windings to one neutral lead.

PIERRE BRICOUT.

REFERENCES CITED

The following references are of record in the file of this patent:

UNITED STATES PATENTS

| Number | Name | Date |
|---|---|---|
| 1,988,008 | Horsley | Jan. 15, 1935 |
| 1,947,484 | Miller | Feb. 20, 1934 |
| 2,006,806 | Hagen | July 2, 1935 |
| 1,308,041 | Chubb | July 1, 1919 |
| 1,094,778 | Churchward | Apr. 28, 1914 |
| 1,180,800 | Taylor | Apr. 25, 1916 |